(12) United States Patent
Miller

(10) Patent No.: US 7,408,506 B2
(45) Date of Patent: Aug. 5, 2008

(54) METHOD AND APPARATUS FOR CONSERVING POWER ON A MOBILE DEVICE THROUGH MOTION AWARENESS

(75) Inventor: John David Miller, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 296 days.

(21) Appl. No.: 10/993,753

(22) Filed: Nov. 19, 2004

(65) Prior Publication Data

US 2006/0119508 A1    Jun. 8, 2006

(51) Int. Cl.
*G01S 5/14* (2006.01)
(52) U.S. Cl. .............................. 342/357.17; 455/127.5; 455/343.1; 455/343.2; 455/343.4; 455/574
(58) Field of Classification Search ............ 342/357.17; 455/127.5, 343.1–343.4, 574
See application file for complete search history.

(56) References Cited

U.S. PATENT DOCUMENTS

| | | | | |
|---|---|---|---|---|
| 3,019,292 | A * | 1/1962 | John ........................... | 348/146 |
| 3,992,707 | A * | 11/1976 | Schmidtlein et al. .......... | 342/58 |
| 5,491,486 | A * | 2/1996 | Welles et al. ............ | 342/357.07 |
| 5,953,677 | A * | 9/1999 | Sato ........................... | 455/574 |
| 5,987,062 | A * | 11/1999 | Engwer et al. ............... | 375/225 |
| 6,067,044 | A * | 5/2000 | Whelan et al. .......... | 342/357.07 |
| 6,249,680 | B1 * | 6/2001 | Wax et al. ................. | 455/456.2 |
| 6,512,935 | B1 * | 1/2003 | Redi ........................... | 455/574 |
| 6,584,331 | B2 * | 6/2003 | Ranta ........................... | 455/574 |
| 6,611,688 | B1 * | 8/2003 | Raith ....................... | 455/456.1 |
| 6,625,135 | B1 * | 9/2003 | Johnson et al. ............. | 370/332 |
| 6,812,887 | B2 * | 11/2004 | Syrjarinne et al. ...... | 342/357.12 |
| 6,955,145 | B1 * | 10/2005 | McCabe et al. .......... | 123/90.15 |
| 7,016,705 | B2 * | 3/2006 | Bahl et al. ................... | 455/566 |
| 2002/0127967 | A1 * | 9/2002 | Najafi ........................ | 455/3.05 |
| 2002/0177476 | A1 * | 11/2002 | Chou .......................... | 455/574 |
| 2004/0257276 | A1 * | 12/2004 | Huston et al. .......... | 342/357.03 |
| 2006/0211430 | A1 * | 9/2006 | Persico ..................... | 455/456.1 |
| 2007/0049289 | A1 * | 3/2007 | Woo ........................ | 455/456.1 |

* cited by examiner

*Primary Examiner*—Thomas G. Black
*Assistant Examiner*—Shelley Chen
(74) *Attorney, Agent, or Firm*—Blakely, Sokoloff, Taylor & Zafman LLP

(57) ABSTRACT

An apparatus and method for conserving power on a mobile device through motion awareness. The method includes a motion model that receives location information from one or more receivers and an accelerometer. The motion model determines whether the mobile device is in motion based on the received information. If the mobile device is in motion, a scanning rate for the one or more receivers is determined based on a velocity vector, the velocity vector being determined from the received information; the determined scanning rate is sent to the one or more receivers to enable them to operate at the determined scanning rate; and the process is repeated. If the mobile device is not in motion, the scanning operations for the one or more receivers are halted while the mobile device is stationary; scanning operations for the one or more receivers are resumed when an indication that the mobile device is moving again is received from the accelerometer; and the process is repeated.

16 Claims, 2 Drawing Sheets

METHOD AND APPARATUS FOR CONSERVING POWER ON A MOBILE DEVICE THROUGH MOTION AWARENESS

BACKGROUND OF THE INVENTION

1. Field of the Invention

Embodiments of the present invention are generally related to the field of location aware computing. More particularly, embodiments of the present invention are related to the conservation of power on a mobile device through motion awareness.

2. Description

Many mobile device capabilities require the device to know where it is located. Two such capabilities include always best-connected computing and location-aware computing. In the case of always best-connected computing, one common practice for keeping a device online as it roams is to scan the air for received RF (radio frequency) signals and then use the resultant information to determine which cell towers, Wi-Fi (Wireless Fidelity) access points, or Bluetooth devices are nearby in order to make connection decisions. Location-aware computing may also use RF signal information or received Global Positioning System (GPS) satellite data to compute and track the device's current location. Both of these capabilities consume precious battery power.

Currently, motion models may be used with always best-connected computing and location-aware computing activities to combat the power drain problem on the mobile device. Motion models often throttle back the always best-connected and location-aware computing activities when the mobile device is determined to be moving slowly or not moving at all and then ramp them back up when the motion model believes that the mobile device is moving again. However, with no other inputs besides the information from the always best-connected and location-aware computing activities to determine when the mobile device is moving again, the motion model is little more than a feedback loop with a negative implication of reducing its accuracy whenever it reduces power consumption. Since scanning and GPS tracking are essentially polling activities, power savings are accomplished by lowering the measurement duty cycle, i.e., scanning less frequently. At lower power states, a lag between actual motion and detection of that motion during the next duty cycle is introduced, thereby artificially establishing a floor for power savings below which this imprecision becomes unacceptable.

Thus, what is needed is a method and apparatus for conserving power on a mobile device through motion awareness that eliminates scan-polling or GPS tracking when the mobile device is stationary. What is also needed is a method and apparatus for incorporating another input to the motion model that determines whether the mobile device is stationary or moving independent of the information from the always best-connected and location-aware computing activities.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which embodiments of the present invention would be of significant utility.

Reference in the specification to "one embodiment", "an embodiment" or "another embodiment" of the present invention means that a particular feature, structure or characteristic described in connection with the embodiment is included in at least one embodiment of the present invention. Thus, the appearance of the phrases "in one embodiment" and "in an embodiment" appearing in various places throughout the specification are not necessarily all referring to the same embodiment.

Embodiments of the present invention are directed to a method and apparatus for reducing power consumption in a mobile device by detecting when the mobile device is in motion as well as when the mobile device is not in motion. This information may then be used to throttle activities that need not run (or run less often) when the mobile device is not in motion. This is accomplished by adding an accelerometer as an input to the motion model. With the accelerometer, the need for scan-polling or GPS tracking to determine if a mobile device has moved is eliminated. The incorporation of the accelerometer makes detecting new motion event driven.

Figure 1:
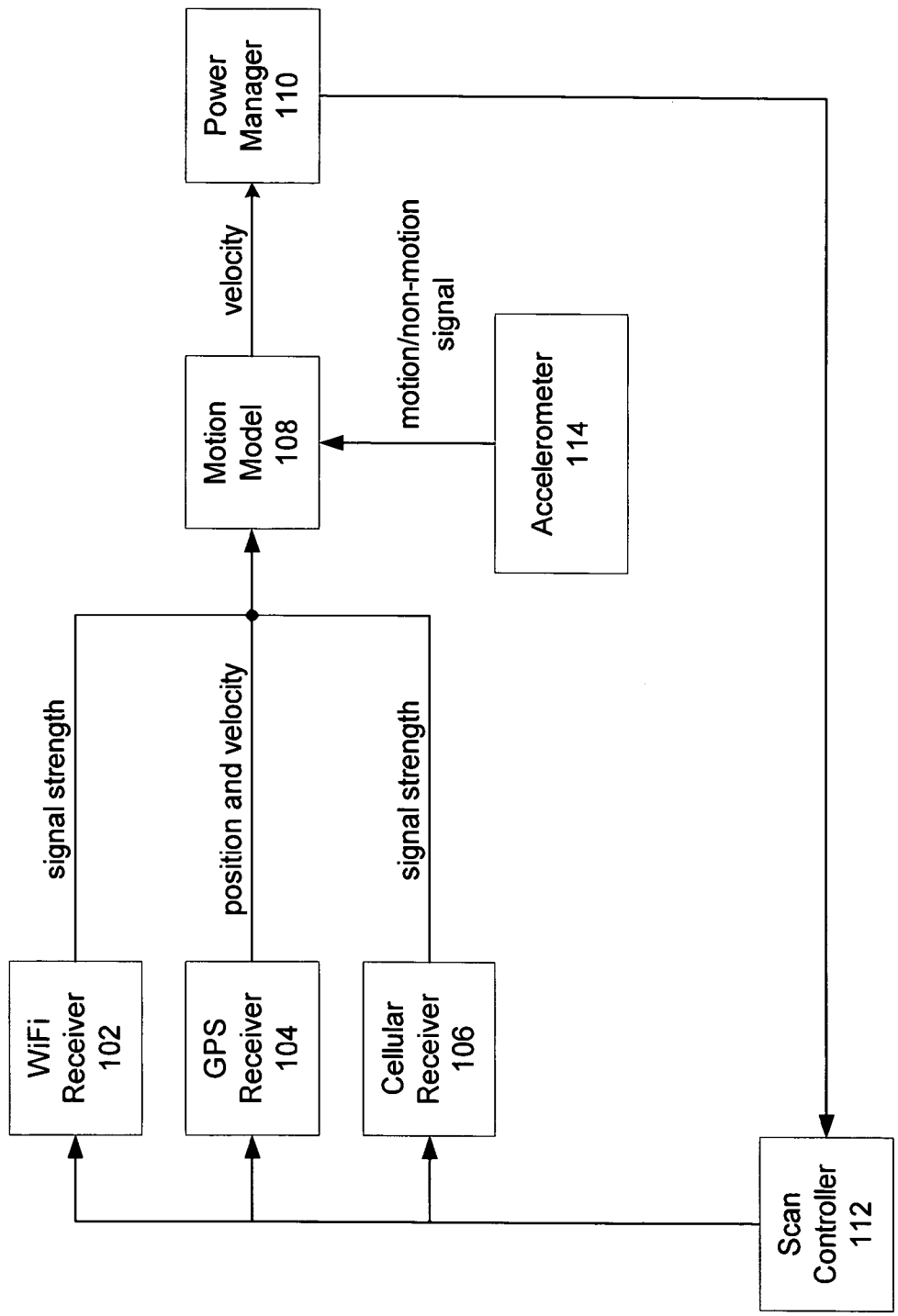
FIG. 1 is a block diagram illustrating an exemplary apparatus for conserving power on a mobile device through motion awareness according to an embodiment of the present invention.

FIG. 1 is a block diagram illustrating an exemplary apparatus 100 for conserving power on a mobile device through motion awareness according to an embodiment of the present invention. Apparatus 100 may comprise one or more scanning receivers, such as, for example, a Wi-Fi receiver 102, a GPS receiver 104, and/or a cellular receiver 106. Apparatus 100 also comprises a motion model 108, a power manager 110, a scan controller 112, and an accelerometer 114. Wi-Fi receiver 102, GPS receiver 104, and/or cellular receiver 106 are coupled to motion model 108. Motion model 108 is coupled to power manager 110 and accelerometer 114. Power manager 110 is coupled to scan controller 112. Scan controller 112 is coupled to WiFi receiver 102, GPS receiver 104, and/or cellular receiver 106. Each of receivers 102, 104, and 106 scan for radio signals that may be used by the mobile device to determine the location of the mobile device.

Wi-Fi receiver 102 may be used to scan the air for received RF signals and then use the resultant information to determine which Wi-Fi access points are nearby in order to make a connection. Upon determining the information regarding the Wi-Fi access points, Wi-Fi receiver 102 sends signal strength data of the Wi-Fi access points to motion model 108 while Wi-Fi receiver 102 is in the scanning mode.

GPS receiver 104 may be used to scan the air for received GPS satellite data to compute and track the mobile device's current location. Upon determining the mobile device's current location, GPS receiver 104 sends position and velocity data to motion model 108 while GPS receiver 104 is in the scanning mode.

Cellular receiver 106 may be used to scan the air for received RF signals and then use the resultant information to determine which cell towers are nearby in order to make a connection with the closest cell tower. While determining which cell tower to connect with, cellular receiver 106 sends signal strength data received from the cell towers to motion model 108 while cellular receiver 106 is in the scanning mode.

Accelerometer 114 is a device that measures the acceleration of a moving body, such as, for example, the acceleration of the mobile device. In an embodiment, accelerometer 114 may be in the form of a motion-triggered switch (i.e., a mercury switch, a micro-electronic mechanical switch, etc.). Although not required, in some embodiments, accelerometer 114 may include thresholds that are set to filter out jitter noise.

Accelerometer 114 sends signals to motion model 108 indicating whether or not the mobile device is in motion. When the scanning operation of the receivers, such as Wi-Fi receiver 102, GPS receiver 104, and/or cellular receiver 106, incorporated in the mobile device have been halted or reduced to a lower duty cycle to conserve power in the mobile device due to the non-motion of the mobile device, it is accelerometer 114 that provides motion model 108 with an indication that the mobile device has started moving again. Thus, by using the accelerometer to trigger motion model 108 that the mobile device is moving again, the lag time between actual motion and detection during the next duty cycle of the one or more receivers incorporated in the mobile device is eliminated. In other words, with the addition of accelerometer 114, motion model 108 may be triggered to wake up by accelerometer 114 without any of receivers 102, 104, and/or 106 operating in the scan mode. Thus, accelerometer 114 knows instantaneously when the mobile device is moving again. This enables the scanning operation of the one or more receivers (102, 104, and/or 106) to be shut down completely to conserve more power, yet retain an instantaneous response when the mobile device starts to move again. Therefore, with embodiments of the present invention, the need to wait until the next duty cycle of the operation of receivers 102, 104, and/or 106 to determine whether movement of the mobile device has resumed is eliminated. In other words, the lag time between actual motion of the mobile and the detection of that motion is eliminated.

In one embodiment, dampening may be required to keep motion model 108 from causing power manager 110 to enable scanning controller 112 to start the scanning of receivers 102, 104, and/or 106 prematurely, i.e., slight movement of the mobile device even though the user of the mobile device is stationary.

Motion model 108 receives the signal strength data from Wi-Fi receiver 102 and cellular receiver 106, the position and velocity data from GPS receiver 104, and signal data to indicate whether or not the mobile device is in motion from accelerometer 114, and combines the data into a motion model to provide a final velocity vector. The final velocity vector is modeled based on the rate at which the mobile device is computing its location. For example, if the mobile device is moving slowly, the velocity vector is determined at a rate comparable to the slow movement of the mobile device and vice versa. The rate may also be proportional to the amount of power to be conserved.

Motion model 108 utilizes all signals from receivers 102, 104, 106 and accelerometer 114 to determine the velocity of the mobile device. Motion model 108 does not rely solely on accelerometer 114 during scanning of receivers 102, 104, and/or 106 to determine whether the mobile device is in motion. This is because in some instances there may be an apparent motion of zero indicated by the accelerometer when there is no acceleration, yet the mobile device may be in a moving car, airplane, train, etc. moving at a constant speed. Thus, when it is known that the mobile device is in motion, the data from accelerometer 114 is not as important as the data being received from receivers 102, 104, and/or 106. When motion model 108 can tell that the mobile device is truly at rest, or at least at rest with respect to the Earth, then the data from accelerometer 114 is more important than any data from receivers 102, 104, and/or 106, and often times may be the only data used by motion model 108 to determine whether the mobile device is in motion again.

Power manager 110 receives the final velocity vector from motion model 108 and determines a scanning rate. The scanning rate is sent to scan controller 112 to control the scanning operation of receivers 102, 104, and/or 106. If it is determined that the mobile device is not in motion, then the scanning rate may be set at zero by power manager 110, and scan controller 112 will halt the scanning of receivers 102, 104, and/or 106. By halting the scanning of receivers 102, 104, and/or 106, receivers 102, 104, and/or 106 utilize little or no power from the mobile device, thus, conserving the battery power of the mobile device. If it is determined that the mobile device is in motion, then power manager 110 will set the scanning rate proportional to the velocity of the mobile device, and scan controller 112 will control the scanning rate of receivers 102, 104, and/or 106 accordingly. Receivers 102, 104, and/or 106 may now utilize the battery power of the mobile device in proportion to the velocity of the mobile device.

Figure 2:
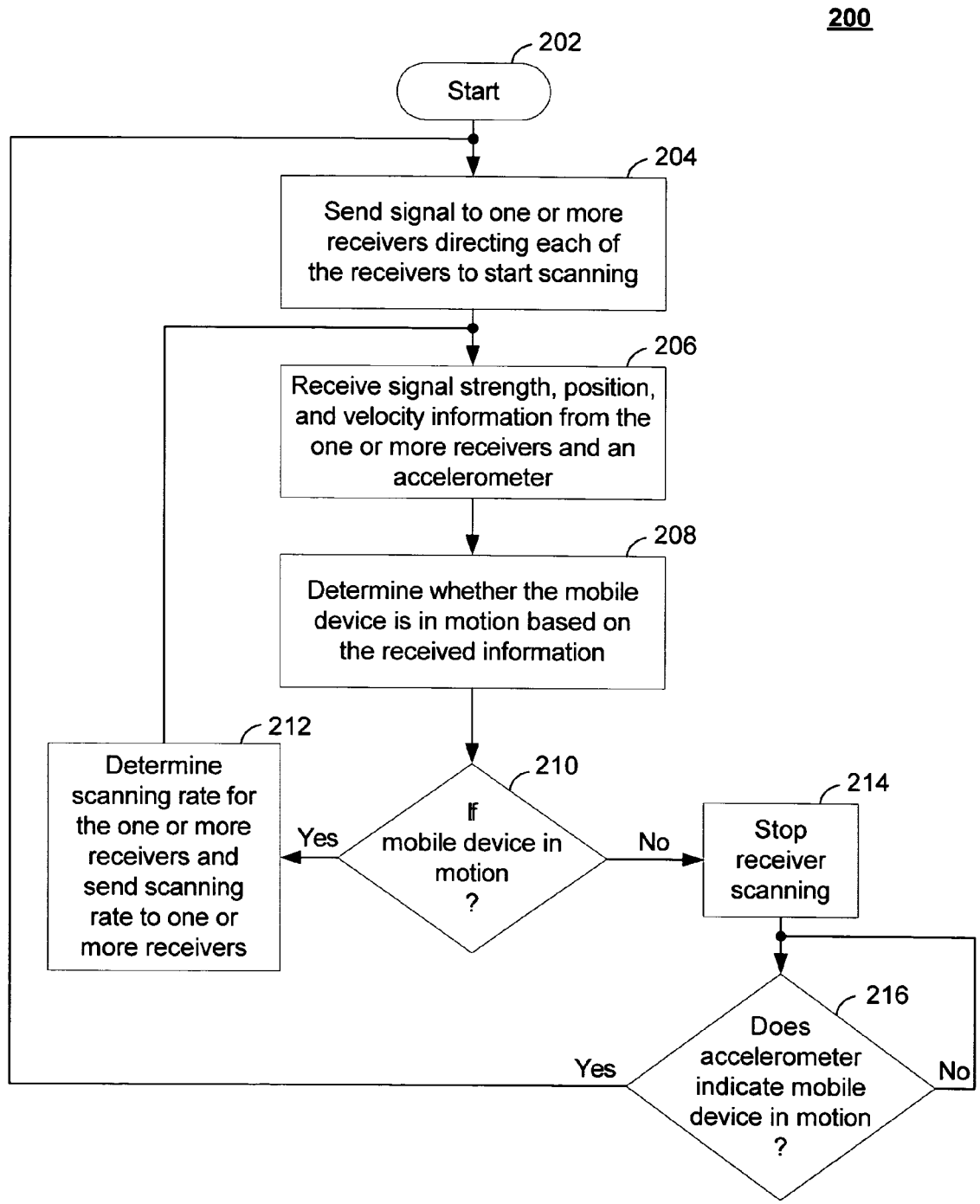
FIG. 2 is a flow diagram illustrating an exemplary method for conserving power on a mobile device through motion awareness according to an embodiment of the present invention.

FIG. 2 is a flow diagram 200 illustrating an exemplary method for conserving power on a mobile device through motion awareness according to an embodiment of the present invention. The invention is not limited to the embodiment described herein with respect to flow diagram 200. Rather, it will be apparent to persons skilled in the relevant art(s) after reading the teachings provided herein that other functional flow diagrams are within the scope of the invention. The process begins at 202, where the process immediately proceeds to block 204.

Scan controller 112 sends signals to one or more receivers within the mobile device, such as, for example, Wi-Fi receiver 102, GPS receiver 104, and/or cellular receiver 106, directing each of the receivers incorporated in the mobile device to start scanning for location information in block 204. In one embodiment, the scanning rate is a pre-determined start up scanning rate.

In block 206, the one or more receivers receive information helpful to determining the position of the mobile device and send the information to a motion module. Depending upon the type of receiver, the information may include signal strength data from a plurality of Wi-Fi access points, signal strength data from a plurality of cell towers, data from a plurality of GPS satellites for deriving position and velocity information, or information from other types of receivers that may be used in determining the location of the mobile device. The motion module also receives information from an accelerometer. The information from the accelerometer indicates whether or not the mobile device is in motion.

In block 208, the motion module determines whether the mobile device is in motion based upon the received information. The motion module takes into account all of the information from the receivers and the accelerometer in determining whether or not the mobile device is in motion and outputs a final velocity vector based on all of the information received. This helps to eliminate a false reading from the accelerometer when, for example, the mobile device is in motion, but is traveling at a constant speed. The process then proceeds to decision block 210.

In decision block 210, if it is determined that the mobile device is in motion, the process proceeds to block 212. In block 212, the scanning rate for the receivers is determined based on the velocity vector and sent to the scan controller to control the scanning rate of the receivers. The process then proceeds back to block 206 to continue sending the information received from the receivers to the motion model to enable the motion model to determine a final velocity vector.

Returning to decision block 210, if it is determined that the mobile device is not in motion, the process proceeds to block 214. In block 214, based on the results of the velocity vector, the scan controller receives a scanning rate of approximately zero, and thereby, halts the scanning of the receivers. Halting the scanning of the receivers causes the receivers to consume little or no battery power from the mobile device. In one embodiment of the invention, the scan controller may cause the receivers to continue scanning, but at a much lower scanning rate, thereby consuming a great deal less power of the mobile device's battery. The process then proceeds to decision block 216.

In decision block 216, it is determined whether the mobile device has resumed motion. The motion model will receive an instantaneous signal from the accelerometer, indicating movement of the mobile device, when the mobile device starts moving again. This signal may be referred to as being interrupt driven. If it is determined that the mobile device is stationary (i.e, motion model receives signal from accelerometer indicating that the mobile device is not moving), the process remains at decision block 216. Alternatively, if it is determined that the mobile device has resumed movement, the process proceeds back to block 204, to enable the receivers to resume or start scanning again.

Certain aspects of embodiments of the present invention may be implemented using hardware, software, or a combination thereof and may be implemented in one or more computer systems or other processing systems. In fact, in one embodiment, the methods may be implemented in programs executing on programmable machines such as mobile or stationary computers, personal digital assistants (PDAs), set top boxes, cellular telephones and pagers, and other electronic devices that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that embodiments of the invention may be practiced with various computer system configurations, including multiprocessor systems, minicomputers, mainframe computers, and the like. Embodiments of the present invention may also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the methods described herein. Alternatively, the methods may be performed by specific hardware components that contain hardwired logic for performing the methods, or by any combination of programmed computer components and custom hardware components. The methods described herein may be provided as a computer program product that may include a machine readable medium having stored thereon instructions that may be used to program a processing system or other electronic device to perform the methods. The term "machine readable medium" or "machine accessible medium" used herein shall include any medium that is capable of storing or encoding a sequence of instructions for execution by the machine and that causes the machine to perform any one of the methods described herein. The terms "machine readable medium" and "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. A location awareness mobile device power conservation method, comprising:

receiving location information from one or more receivers in a mobile cellular communications device;

receiving a signal indicating whether or not the mobile cellular communications device is in motion from an accelerometer in the mobile cellular communications device;

determining a velocity vector from the location information received;

if the velocity vector indicates that the mobile cellular communications device is not in motion, enabling scanning operations for the one or more receivers to be halted to conserve battery power for the mobile cellular communications device while the mobile device is stationary; and enabling scanning operations for the one or more receivers to resume when an indication that the mobile cellular communications device is moving again is received from the accelerometer;

if the velocity vector indicates that the mobile cellular communications device is in motion, setting a scanning rate for the one or more receivers to a value at least in part proportional to the magnitude of the velocity vector such that battery power consumption of the mobile cellular communications device is directly proportional to the velocity of the mobile cellular communications device; and repeating the process until the mobile cellular communications device is placed in an off position.

2. The method of claim 1, further comprising:
enabling the scanning rate to be sent to the one or more receivers to enable the one or more receivers to operate at the scanning rate.

3. The method of claim 1, wherein the one or more receivers comprises at least a cellular communications compliant receiver and one or more of a Wi-Fi (Wireless Fidelity) receiver, a GPS (Global Positioning System) receiver, and any other type of receiver capable of providing location information.

4. The method of claim 1, wherein the one or more receivers comprise at least a cellular communications compliant receiver and a Wireless Fidelity (Wi-Fi) receiver and wherein the location information comprises signal strength information from a plurality of wireless fidelity access points.

5. The method of claim 1, wherein the one or more receivers comprise a cellular receiver and wherein the location information comprises signal strength information from a plurality of cell towers.

6. The method of claim 1, wherein the one or more receivers comprise at least a cellular communications compliant receiver and a Global Positioning System (GPS) receiver and the location information comprises position and velocity data derived from satellite data.

7. An apparatus for conserving power, comprising:
at least one receiver to determine location information for a mobile cellular communications device;
an accelerometer to determine whether the mobile cellular communications device is in motion;
a motion model, coupled to the at least one receiver and the accelerometer to determine a velocity vector based on the information received from the at least one receiver and the accelerometer;
a power manager coupled to the motion model to determine a scanning rate for the at least one receiver;
a scan controller, coupled to the power manager and the at least one receiver to enable or disable scanning operations for the at least one receiver based on the scanning rate, wherein when the velocity vector indicates that the mobile cellular communications device is stationary, scanning of the at least one receiver is halted to conserve battery power on the mobile cellular communications device, wherein scanning of the at least one receiver is resumed when the accelerometer triggers the motion model to indicate that the mobile cellular communications device is in motion again such that battery power consumption of the mobile cellular communications device is directly proportional to the velocity of the mobile cellular communications device; and
the scan controller further to set a scanning rate for the one or more receivers to a value, at least in part, proportional to the magnitude of the velocity vector if the velocity vector indicates that the mobile cellular communications device is in motion.

8. The apparatus of claim 7, wherein the at least one receiver to provide always best-connected computing data to the motion model.

9. The apparatus of claim 7, wherein the at least one receiver to provide location-aware computing data to the motion model.

10. The apparatus of claim 7, wherein the accelerometer to provide an indication of whether or not the mobile cellular communications device is in motion.

11. An article comprising: a computer readable storage medium having a plurality of machine accessible instructions, wherein when the instructions are executed by a processor, the instructions provide for:
receiving location information from one or more receivers in a mobile cellular communications device;
receiving a signal indicating whether or not the mobile cellular communications device is in motion from an accelerometer in the mobile cellular communications device;
determining a velocity vector from the location information received;
if the velocity vector indicates that the mobile cellular communications device is not in motion, enabling scanning operations for the one or more receivers to be halted to conserve battery power for the mobile cellular communications device while the mobile cellular communications device is stationary; and
enabling scanning operations for the one or more receivers to resume when an indication that the mobile cellular communications device is moving again is received from the accelerometer;
if the velocity vector indicates that the mobile cellular communications device is in motion, setting a scanning rate for the one or more receivers to a value at least in part proportional to the magnitude of the velocity vector such that battery power consumption of the mobile cellular communications device is directly proportional to the velocity of the mobile cellular communications device; and
repeating the process until the mobile cellular communications device is placed in an off position.

12. The article of claim 11, further comprising instructions for:
enabling determination of a scanning rate based on the velocity vector: and
enabling the scanning rate to be sent to the one or more receivers to enable the one or more receivers to operate at the scanning rate.

13. The article of claim 11, wherein the one or more receivers comprises at least a cellular communications compliant receiver and one or more of a Wi-Fi (Wireless Fidelity) receiver, a GPS (Global Positioning System) receiver, a cellular receiver, and any other type of receiver capable of providing location information.

14. The article of claim 11, wherein the one or more receivers comprise at least a cellular communications compliant receiver and a Wireless Fidelity (Wi-Fi) receiver and wherein the location information comprises signal strength information from a plurality of wireless fidelity access points.

15. The article of claim 11, wherein the one or more receivers comprise at least a cellular communications compliant receiver and a cellular receiver and wherein the location information comprises signal strength information from a plurality of cell towers.

16. The article of claim 11, wherein the one or more receivers comprise a Global Positioning System (GPS) receiver and the location information comprises position and velocity data derived from satellite data.

* * * * *